US010108607B2

(12) United States Patent
Song et al.

(10) Patent No.: US 10,108,607 B2
(45) Date of Patent: Oct. 23, 2018

(54) METHOD AND DEVICE FOR MACHINE TRANSLATION (71) Applicant: Alibaba Group Holding Limited, Grand Cayman (KY)

(72) Inventors: Kai Song, Hangzhou (CN); Weihua Luo, Hangzhou (CN); Feng Lin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 15 days.

(21) Appl. No.: 15/223,950

(22) Filed: Jul. 29, 2016

(65) Prior Publication Data

US 2017/0031901 A1 Feb. 2, 2017

(30) Foreign Application Priority Data

Jul. 30, 2015 (CN) .......................... 2015 1 0461455

(51) Int. Cl.
*G06F 17/28* (2006.01)
*G06F 17/27* (2006.01)
*G06F 17/21* (2006.01)

(52) U.S. Cl.
CPC ...... *G06F 17/2872* (2013.01); *G06F 17/2705* (2013.01); *G06F 17/2775* (2013.01); *G06F 17/289* (2013.01); *G06F 17/2818* (2013.01); *G06F 17/2827* (2013.01)

(58) Field of Classification Search
None
See application file for complete search history.

(56) References Cited

U.S. PATENT DOCUMENTS

| 4,730,270 | A | * | 3/1988 | Okajima | ............... | G06F 17/271 |
| | | | | | | 704/2 |
| 4,980,829 | A | | 12/1990 | Okajima et al. | | |
| 5,005,127 | A | | 4/1991 | Kugimiya et al. | | |
| 5,687,383 | A | | 11/1997 | Nakayama et al. | | |
| 6,092,034 | A | | 7/2000 | McCarley et al. | | |
| 6,233,546 | B1 | | 5/2001 | Datig | | |
| 6,289,302 | B1 | | 9/2001 | Kuo | | |

(Continued)

OTHER PUBLICATIONS

PCT Search Report and Written Opinion dated Dec. 8, 2016 for PCT Application No. PCT/IB2016/001201, 11 pages.

*Primary Examiner* — Satwant Singh
(74) *Attorney, Agent, or Firm* — Lee & Hayes, PLLC (57) ABSTRACT A machine translation method includes determining source language text to be translated and obtaining a translation rule table, which has been trained in advance, that includes multiple translation rules associated with the target language text and the source language text in multiple languages; determining candidate results of the target language text; and determine the target language text to be output based on the candidate results. During the translation, a specific language of the source language text need not to be specified by a user. The implementations improve accuracy of the translation, and avoid errors introduced from the process of language identification during recognizing unknown languages. The implementations avoid developing a translation engine for an individual source language of text to be translated for a certain target language, and therefore save development costs and computing resources.

20 Claims, 6 Drawing Sheets (56) References Cited

U.S. PATENT DOCUMENTS

| | | | | |
|---|---|---|---|---|
| 7,321,850 B2* | 1/2008 | Wakita | ............... | G06F 17/2827 |
| | | | | 704/10 |
| 8,818,790 B2* | 8/2014 | He | ...................... | G06F 17/2827 |
| | | | | 704/2 |
| 9,740,688 B2* | 8/2017 | Huang | ............... | G06F 17/2818 |
| 9,836,457 B2* | 12/2017 | Fujiwara | ............. | G06F 17/2854 |
| 2008/0306727 A1* | 12/2008 | Thurmair | ............ | G06F 17/2818 |
| | | | | 704/4 |
| 2011/0022380 A1 | 1/2011 | Zaslavskiy et al. | | |
| 2011/0184718 A1 | 7/2011 | Chen | | |
| 2012/0016657 A1* | 1/2012 | He | ...................... | G06F 17/2836 |
| | | | | 704/2 |
| 2013/0117010 A1* | 5/2013 | Hwang | ............... | G06F 17/2818 |
| | | | | 704/2 |
| 2013/0158975 A1* | 6/2013 | Hwang | ............... | G06F 17/2818 |
| | | | | 704/2 |
| 2017/0060854 A1* | 3/2017 | Zeng | ................. | G06F 17/2705 |
| 2017/0060855 A1* | 3/2017 | Song | ................. | G06F 17/2818 |
| 2018/0101522 A1* | 4/2018 | Fujiwara | ............ | G06F 17/2854 |

* cited by examiner

佛罗里达　　州　　的　　最高　　点 the　　highest　　point　　in　　Florida

METHOD AND DEVICE FOR MACHINE TRANSLATION

CROSS REFERENCE TO RELATED PATENT APPLICATIONS

This application claims priority to Chinese Patent Application No. 201510461455.8, filed on Jul. 30, 2015, entitled "Method and Device for Machine Translation," which is hereby incorporated by reference in its entirety.

TECHNICAL FIELD

This present disclosure relates to the field of computer technology, and more particularly to methods and devices for machine translation.

BACKGROUND

The so-called machine translation utilizes computer programs for automatic language translation. In general, machine translation is implemented using computer programs to achieve translation from one language to another language. Conventional machine translation programs include a large amount of translation rules that are defined by human beings. These rules are rewritten into computer programs to implement machine translation. Rule-based machine translation has high translation quality, high costs, and low rule coverage, and the translation results are ambiguous in some cases. As computer processing power continues to increase, translation training sub-models (including translation rule tables, language models, and reordering models etc.) are trained using a large scale bilingual corpus, and are used to determine ideal translation text based on scores of these sub-models. This machine translation is also called statistical machine translation. In general, statistical machine translation is a type of machine translation and has better performance as compared to other machine translation types in a non-limiting field. The basic idea of statistical machine translation is to perform statistical analysis on a large number of parallel corpus, build statistical translation models, and perform translation using the models. Statistical machine translation models include a translation model based on words, a translation model based on phrases and a translation model based on the syntax. Among them, the most widely used model is a translation model based on phrases (or hierarchy phrases).

With respect to all existing statistical machine translation processes, the design principle and the premise are based on a specified source language and a target language. Also, this is the basis of all statistical machine translation processes. In other words, each statistical machine translation engine can only handle translate between a language pair, such as French to English or Chinese to English.

Since many English scenarios involve translation of a large number of different language pairs, such as a website includes multiple language sub-sites and country sub-sites, when a user inputs a query, a computing device may first identify the language of the query and then translate the query into English. The computing device may perform searches using the query in English. This involves translation tasks from dozens of languages to English. Accordingly, the service provider has to develop dozens of translation engines. This results in high development costs and consumes more computing power.

In addition, language identification accuracy has a direct impact on whether user's search intent is truly reflected in search results. Based on the current translation engines, language identification is essential and therefore the language identification using conventional techniques easily introduces errors to the whole querying process.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Implementations herein relate to methods and devices for machine translation. The implementations utilize a translation rule table including the one or more translation rules associated with target language text and source language text in multiple languages to achieve multi-lingual translation from a source language to a target language. During the translation, a specific language of the source language text need not to be identified. The implementations improve accuracy of the translation, and avoid errors introduced from the process of language identification during recognizing unknown languages. The implementations support multi-language translation without performing operations such as segmenting sentences based on individual languages, translating the fragments and then combining translated fragments. The implementations avoid developing a translation engine for an individual source language of text to be translated for a certain target language, and therefore save development costs and computing resources.

The implementations relate to a method for machine translation. The method may include determining, by a computing device, source language text to be translated and obtaining a translation rule table, which has been trained in advance. The translation rule table may include multiple translation rules associated with target language text and the source language text in multiple languages. The computing device may further determine candidate results of the target language text and determine the target language text to be output based on the candidate results.

Corresponding to the method above, the implementations further relate to a device for machine translation. The device may include a first module configured to determine source language text to be translated, obtain a translation rule table including one or more translation rules associated with target language text and the source language text in multiple languages by training in advance, and determine candidate results of the target language text.

BRIEF DESCRIPTION OF THE DRAWINGS

The Detailed Description is described with reference to the accompanying figures. The use of the same reference numbers in different figures indicates similar or identical items.

DETAILED DESCRIPTION

Implementations herein relate to methods and devices for machine translation. The implementations utilize a translation rule table including one or more translation rules associated with target language text and source language text in multiple languages to achieve multi-lingual translation to the target language text from the source language text. During the translation, a specific language of the source language text need not to be identified. The implementations improve accuracy of translation, and avoid errors of language identification during the translation. The implementations support multi-language translation without performing operations such as segmenting based on individual languages into fragments, translating the fragments, and combining translated fragments. The implementations avoid developing a translation engine for an individual language in the source language text for a certain target language, and therefore save development costs and computing resources. The source language text is the original text during a translation process. In general, the source language text may include a sentence, a phrase, or a word. The target language refers to a translated text during the translation process. In general, the source language may include a sentence, a phrase, or a word.

Translation models described in the implementations of the present disclosure may include a translation rule table (e.g., a multi-lingual phrase table) including one or more translation rules associated with target language text and source language text in multiple languages, language models, and reordering models. Each model as described above has a predetermined weight value. The weight value may be obtained by training in advance.

Conventional techniques are limited to determined languages of source language text. In other words, under conventional techniques, for a language pair between source language text in one language and target language text in another language, users have to develop a corresponding translation engine for the language pair. In a scenario involving multiple languages, the conventional techniques have high development costs (e.g., developing a translation engine for a single language) and consume high computing power of servers (e.g., deploying a server for a single language). In addition, in a scenario of unknown language under conventional techniques, a language has to be identified first, and then machine translation can be performed. Otherwise, errors may be introduced during the language identification process, which may lead to unexpected results. Further, in some scenarios, the text to be translated is written in multiple languages. In this situation, machine translation may not be performed using the conventional techniques.

Accordingly, the implementations of the present disclosure improve the conventional techniques to make the translation not sensitive to the source language of the text to be translated. In other words, the implementations may achieve machine translation from multiple source languages to target language text in a single language. This solves problems such as high development costs and high consumption of computing power of servers. This also avoids, in many scenarios, translation errors caused by low recognition accuracy of a certain language, and supports machine translation from source text in mixed languages to target text in a single language. Meanwhile, as compared to machine translation using the conventional techniques, there is substantially no loss in translation quality and performance.

Figure 1:
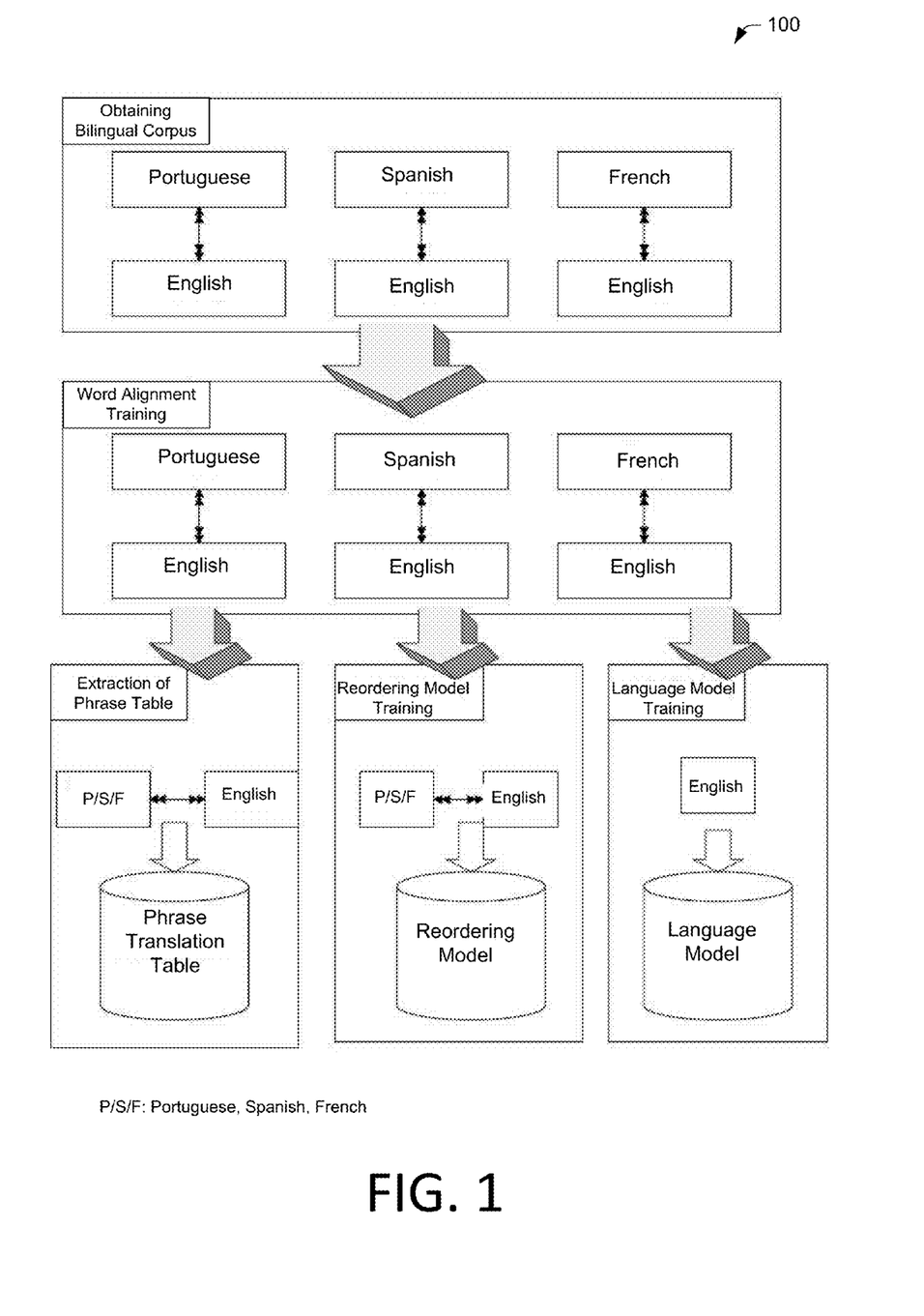
FIG. 1 is a flow chart of an illustrative process for a training phase associated with machine translation in accordance with implementations of the present disclosure.

The implementations of the present disclosure include two stages: training and decoding stages. Referring to FIG. 1, the training stage includes preparation of corpus, corpus pretreatment, word alignment training, phrase table extraction, reordering model training, and language model training. Below are provided in detail.

First, the training stage includes the training corpus preparation. A traditional statistical machine translation system requires a bilingual parallel corpus between a source language and a target language (e.g., a language pair). For example, "English French" translation system requires a bilingual parallel corpus between English and French. In implementations, a computing device (e.g., a server) may separately obtain bilingual parallel corpus for multiple pairs. For example, to translate text in Portuguese, Spanish, and France into English, the computing device may obtain three bilingual parallel corpus for three pairs: Portuguese-English, Spanish-English, and France-English. In these instances, corpus of English segments may be inconsistent. In other words, corpus of English segments in the language pairs need not to be the same. The corpus may be different sentences in English as long as parallel corpus of a language pair is formed by a corresponding and respective target language segment. Sizes of bilingual parallel corpus of individual pairs are substantially the same. In other words, a number of sentences of each language pair is substantially the same.

As for bilingual corpus preprocessing, the bilingual parallel corpus refers to machine translation training corpus for sentence level alignments, and two sentences of each row in corpus are mutual translations. For example, suppose two named "Chinese.txt" and "English.txt" text file, each file contains 100 sentences, and these sentences of the same row of the two documents are mutual translations. In other words, sentence i in Chinese.txt and sentence i in English.txt are mutual translations.

Bilingual corpus preprocessing stage mainly includes segmentation, punctuation and recognition, translation, and generalization of numerous strings. The translation process refers to translation using rules and does not involve knowledge of statistics. A main purpose of the preprocessing stage is to relieve data sparseness problems during a word alignment process.

In implementations, the implementations may pre-process the bilingual corpus to generalize numerous strings to corresponding labels to reduce the model data sparseness problems during the subsequent training process. In addition, the implementations may separate sentence punctuations from text. In these instances, a string refers to a word or phrase that is formed by continuous characters, or even sentences. A label refers to a label representing a type of a string. For example, the label of string "May 2, 2012" is "date." The generalization refers to a way of an automatic reorganization process by a computing device to recognize the numerous strings to identify types of the numerous strings and to use labels to replace the strings. For example, string in a date form such as "May 2, 2012" in the text is replaced by "$date." This is an example of generalization.

Figure 2:
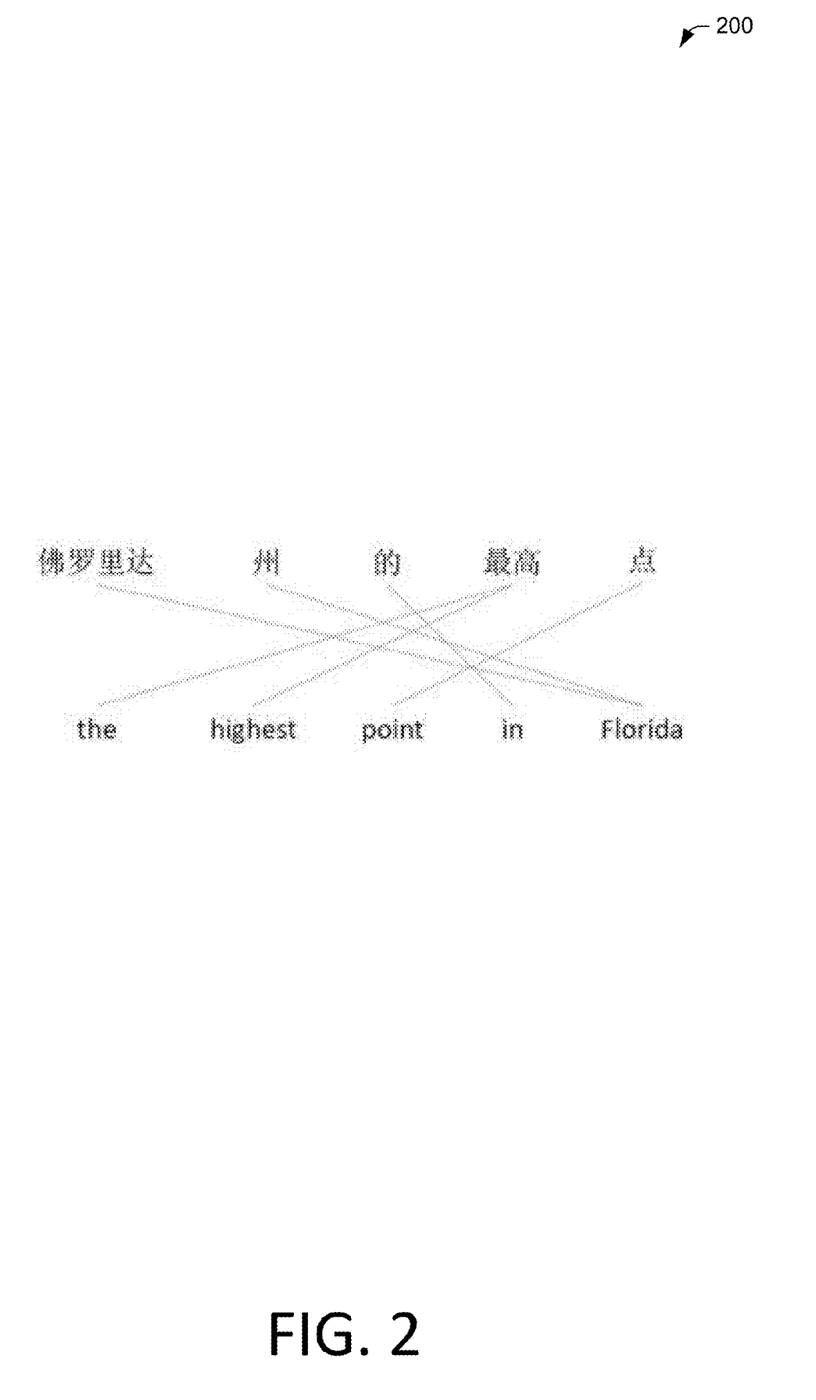
FIG. 2 is a schematic view of an alignment result illustrating alignment of phrases in accordance with implementations of the present disclosure.

As for word alignment training, an ultimate goal of word alignment training is to obtain corresponding relationship of word positions in sentence pairs. The training process is completed based on sentence pairs and does not involve any syntactic structure. For example, as illustrated word alignment results in FIG. 2, The word alignment training may be performed in each language pair separately. A process of the word alignment training of each language pair is similar to a traditional statistical machine translation process to finally give the corresponding relationship between words in each language.

As for determination of multilingual phrase tables, the computing device may extract translation rules to form a translation rules table. For example, extraction of a phrase table refers to extracting phrase pairs mutually translated and providing probability between phrase pairs based on an alignment between a sentence pair and a word and according to traditional rules of consistency.

After the training of word alignments, the computing device may extract translation rules using the training corpus, and provide multiple translation probabilities (e.g., forward translation probability, reverse translation probability, positive vocabulary probability, and reverse vocabulary probability) for each translation rule. A translation rule table is generated based on translation models of phrases, is a collection of translation rules that are obtained in large-scale training of bilingual parallel corpus, and is a basic unit of machine translation.

In implementations, after obtaining word alignment results of each language pair, the computing device may combine source language segments, target language segments, and word alignment results of individual language pairs. For example, at first, the computing device may combine a sentence of Portuguese, Spanish and French of three source language segments and combine the corresponding target language segments in English. Further, the computing device may combine the word alignment results.

For example, file-level consolidation may be achieved. Suppose that there are 300 "Portuguese-English" sentence pairs, 300 "Spanish-English" sentences, 400 "French-English" sentences. Accordingly, after the combination, the number of sentences are 300+300+400=1000. In other words, the number of sentences of the source language segment is 1000, the number of sentences of target language segment is 1000, and the number of word alignment results is 1000.

After the combination of the source language segment, the target language segment, and word alignment results, the computing device may extract phrase tables to obtain a phrase table in multiple languages. The phrase table includes translation rules from phrases of the source language segment to phrases of the target language segment and corresponding translation probabilities.

For example, in the resulting multi-lingual phrase table, a fragment of the source language segment may be Portuguese, Spanish or French. A phrase fragment of the target language segment is English. The phrase fragment includes a single word or a phrase including multiple words. The phrase fragment may have no actual semantic meaning.

The reordering model training may be applied to scoring of translation candidate results. The scoring may decide an order of the translation candidate results of the target language segments.

In implementations, the computing device may obtain language corpus of the source language and the target language and extract training samples for a corresponding reordering training model. These training samples are not limited to a single language pair. Using a maximum entropy classification model, the computing device may obtain a classifier after training the language corpus. For a certain sample, the classifier may determine whether a category of the samples is a positive or reverse sequence, and then whether to perform reordering processes.

The reordering model is essentially a supervised machine learning model, which performs extraction of features from training samples. By iterative training, the supervised machine learning model is a process of obtaining values of all unknown parameters of an objective function (recording model). During identification of a new sample, the computing device, through feature extraction and the values of the training parameters obtained by training, may obtain a score of the reordering model (objective function). The score can be used to directly determine the category of the sample and/or to score a sub-model in other systems.

Training samples of the reordering model may be obtained from results of alignment between a sentence pair and a word pair in two languages. These training samples are used as training data for the maximum entropy classification model. From these training samples, the computing device may extract characteristics of the maximum entropy classification (mainly some reordering features: e.g., information of a word boundary). Based on these training samples, the computing device may obtain the maximum entropy reordering model. During the machine translation decoding stage, the computing device may use this maximum entropy classification model to, for each group of translation candidates to be spliced (e.g., one or more translation results corresponding to a phrase pair), in the process to become a longer fragment (new translation candidate or candidate results), generate scores of "regular order" and "reverse" models. The score of the reordering model as a score of a sub-model of the machine translation decoding process as a whole may intervene final results.

As for training language models, a language model refers to a model that is obtained using knowledge of statistics and a machine learning algorithm on the target language text to evaluate fluency of target language fragments.

Training of language models is performed on the target language segment such as English to obtain a trained statistical model. The model may be used to evaluate fluency of the translation.

The language model is generated based on the target language text to measure statistical probabilities of occurrence of n phrase segments of the target language segment in the target language represented by training corpus of the target language segment and application scenarios such as to reflect fluency of translation fragments.

As for tuning parameters, a machine translation decoding process needs a common guidance of many modules to help the decoder to find the best translation from many translation candidates, such as a translation rule module, a language model module, a reordering model module and so on. Decision-making ability of these modules (e.g., weights) may vary. The weights of these sub-models may be obtain using Minimum Error Rate Training (MERT) or Margin Infused Relaxed Algorithm (MIRA). This process is the parameter tuning.

Decoding process adopts Maximal Entropy Bracket Transduction Grammar (MEBTG) to decode. In other words, for a certain sentence in the source language, the computing device may segment the sentence into fragments and determine multiple translation candidates of each fragment from the phrase translation table. The computing device may continuously combine these translation candidates of the fragments. During the combination process, the computer device may perform filtering and screening based on a score of the phrase table, a score of the language model, and a score of the reordering model to obtain a complete sentence of the target language segment.

The implementations of the present disclosure may provide a decoding process for text in mixed languages. In these instances, the computing device may splice translation candidates of two fragments of the source language segment. If the computing device queries a score of characteristics of the tuning model and there are no results available, the computing device may determine that the two fragments of the source language segment belong to different languages. The computing device may determine that the translation candidates of the source language segment are generated using a positive splicing manner and may not perform a reverse operation.

For example, as for "[esto es] [um livro]", Spanish [esto es] can be translated into English [this is], Portuguese [um livro] can be translated into [a book]. In these instances, the computing device may obtain "[esto es]→[this is]" and "[um livro]→[a book]," two translation candidate. To obtain a compete translation of "[esto es] [urn livro]", splicing two translation candidates may be considered to form a compete translation. To splice two translation fragments, there are two manners to splice fragments: positive or reverse splicing. In these instances, scores of the reordering model in these two situations may be considered. In other words, the computing device may extract characteristics from two kinds of combinations, positive and reverse splicing manners, to obtain the score of the maximum entropy reordering model. When the two fragments of the source language segment are in the same language, the computing device may obtain the score of the maximum entropy model. When the two fragments of the source language segment are not in the same language, during the training of the maximum entropy reordering model, there are no corresponding training samples. Accordingly, the score of the reordering model may not be obtain by querying, and a positive sequence output may be considered.

The decoding stage are described in detail as follows. First of all, based on permutations, the computing device may, by using a word as a boundary, segment input sentences into fragments (e.g., phrases) with various size (e.g., different numbers of words). Suppose that the maximum length of the phrases is 7. The phrase with the maximum length includes 7 words, and the phrase with the minimum length include 1 word.

Figure 3:
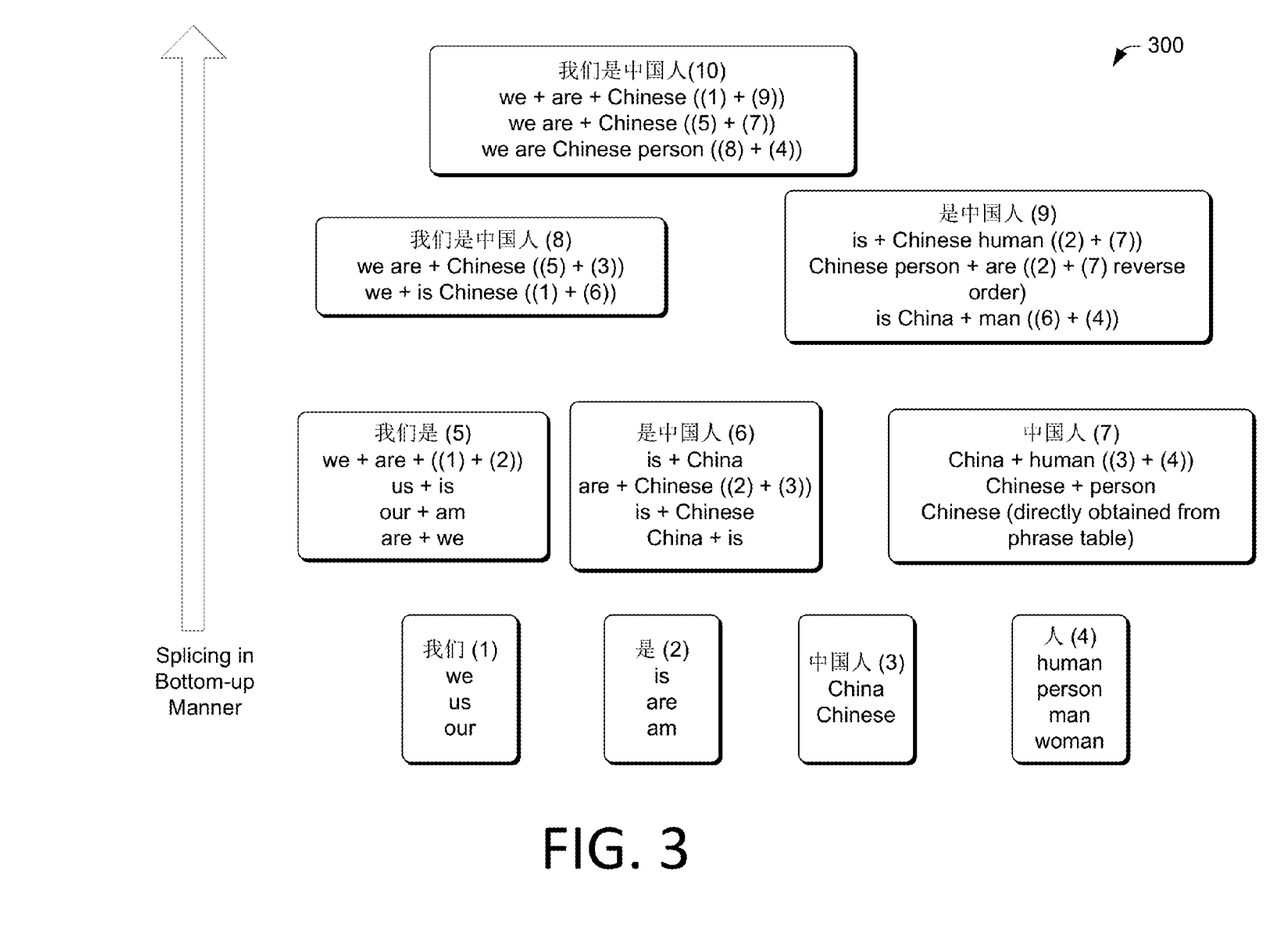
FIG. 3 is a flow chart of an illustrative process for translation results using a bottom-up splicing manner in accordance with implementations of the present disclosure.

For example, if the sentence of the source language segment is "我们都是中，国人," in Chinese (i.e., "we are Chinese person" in English"), the phrases after segmentation may include "我们" in Chinese (i.e., "we" in English), "都是" in Chinese (i.e., "are" in English), "中国" in Chinese (i.e., "Chinese" in English, "人" in Chinese (i.e., "person" in English), "我们都是" in Chinese (i.e., "we are" in English), "都是中国" in Chinese (i.e., "are Chinese") in English), "中国人" in Chinese (i.e., "Chinese person" in English), "我们都是中国" in Chinese (i.e., "we are Chinese" in English), "都是中国人" in Chinese ("are Chinese person" in English), "我们都是中国人" in Chinese (i.e., "we are Chinese person" in English). FIG. 3 shows different English translations for the above segments in Chinese.

For each segmentation mode, from left to right, the computing device may splice translation candidates of the target language segment for each phrase using a bottom-up manner. The computing device may find translation candidates for each phrase from the above described phrase table.

When a phrase includes words in multiple languages, the query of the phrase tables is null, which is not a legal phrase, and the computing device may automatically skip this combination.

FIG. 3 illustrates a bottom-up splicing process. In the above segmentation method, the computing device may acquire translation text for a segmentation unit, and then splice the translation text. If the fragment of the source language segment is long enough such that the fragment has a corresponding translation rule in the phrase tables, the computing device may obtain the translation text for the fragment as a whole. The computing device may use the translation text of the fragment and splice the translation text together as translation candidates for the fragment.

Under a certain splicing manner to splice translation candidates of two fragments of the source language segment, the computing device may, based on a score of the language model, a score of translation probability, and/or a score of reordering model, determine whether such splicing manner results in the best sub-translation result.

For example, the computing device may firstly use the reordering model for determination. In other words, the computing device may use certain two phrase fragments of the source language segment and the corresponding translation candidates of the target language segment as an input. When the computing device cannot find a corresponding result during querying the reordering model, the computing device may determine the positive sequence output without considering the reverse situation. In other words, the computing device may merely compute comprehensive scores of the translation candidates that are spliced in the positive splicing manner, and the scores may be used to decide whether a sub-translation result shows up in the final results. The computing device may generate a type of translation candidates using the positive splicing manner to query and to obtain the score of the reordering model. The computing device may generate another type of translation candidates using the reverse splicing manner to query to obtain the score of the reordering model. A translation result derived from a longer fragment of the source language segment is a result from splicing of two shorter fragments of the target language segment in the positive or the reverse splicing manner, or a translation candidate obtained by directly querying the phrase table using the longer fragment of the source language segment.

The comprehensive score is a comprehensive value for each translation candidate. The comprehensive value is a sum of individual scores of each models multiplied by a corresponding weight. In all translation candidates, one or more translation candidates having the highest comprehensive value become the ultimate translation result. Under various segmentation manners, comprehensive values of all fragments of the target language segment using the positive splicing manner and the reverse splicing manner may be calculated to obtain the final translation result.

In sum, the decoding process involves left-right and bottom-up continuous splicing operations of adjacent phrase fragments of the translation candidates of the target language segment. The splicing operations include positive splicing and reverse splicing. The computing device may obtain a comprehensive score based on the scoring results of each trained model. Based on the comprehensive score, the computing device may determine which translation candidate under a certain splicing manner results in the best result. Different models have different weights, and the computing device may obtain a weight of each model. In other words, during the above parameter tuning process, the weight of each model may be used to determine an important level of the score of each sub-model. Different scores of different models may be multiplied by corresponding weights, and linear addition may be performed to obtain the final comprehensive score.

Scores of each model as described above may include a score of the translation rule table (e.g., translation probability scoring), a score of the language model, and/or a score of the reordering model. The computing device may calculate the score of the translation rule table using information of alignment between a sentence pair and a word pair and statistic information of occurrence frequency of phrases mutually translated to obtain a probability that a certain phrase is translated to the translation corresponding to the target language segment. A phrase of a source target language may result in multiple translation candidates of the target language segment. Accordingly, different translation candidates have different probabilities each represented by a score.

Examples of the decoding process is provided as follow. Suppose that S is the sentence of the source language segment as an input. The S sentence includes a number J of words, the model is represented using u, and the weight is λ. Output is an optimal translation candidate.

First of all, the sentence of the source language segment may be segmented to obtain continuous fragments of the source language segment that have different sizes. These fragments may overlap each other. A fragment corresponds to a cell, and the cell stores translation candidates of the target language segment of the fragment. These translation candidates may be first obtained by querying the phrase table.

The computing device may splice short fragments of the source language segment using a bottom-up manner to generate a longer fragment. During the splicing process, the computing device may invoke a function compose and continuously splice to finally obtain translation candidates for the complete sentence.

The role of the function compose is to splice all translation candidates in the cells corresponding to the two shorter fragments using a positive splicing manner and a reverse splicing manner. The computing device may place the splicing results into the cell corresponding to the longer fragment, and screen the splicing results in the cell based on scores of the models to leave a limited number of translation candidates.

It should be noted that a portion of the translation candidates of the longer fragment may be obtained using methods other than the splicing process. For example, the portion may be obtained by directly querying the phrase table as described above. In other words, the longer fragment is formed by splicing of shorter fragments having different sizes and by placing the splicing results into a cell.

Figure 4:
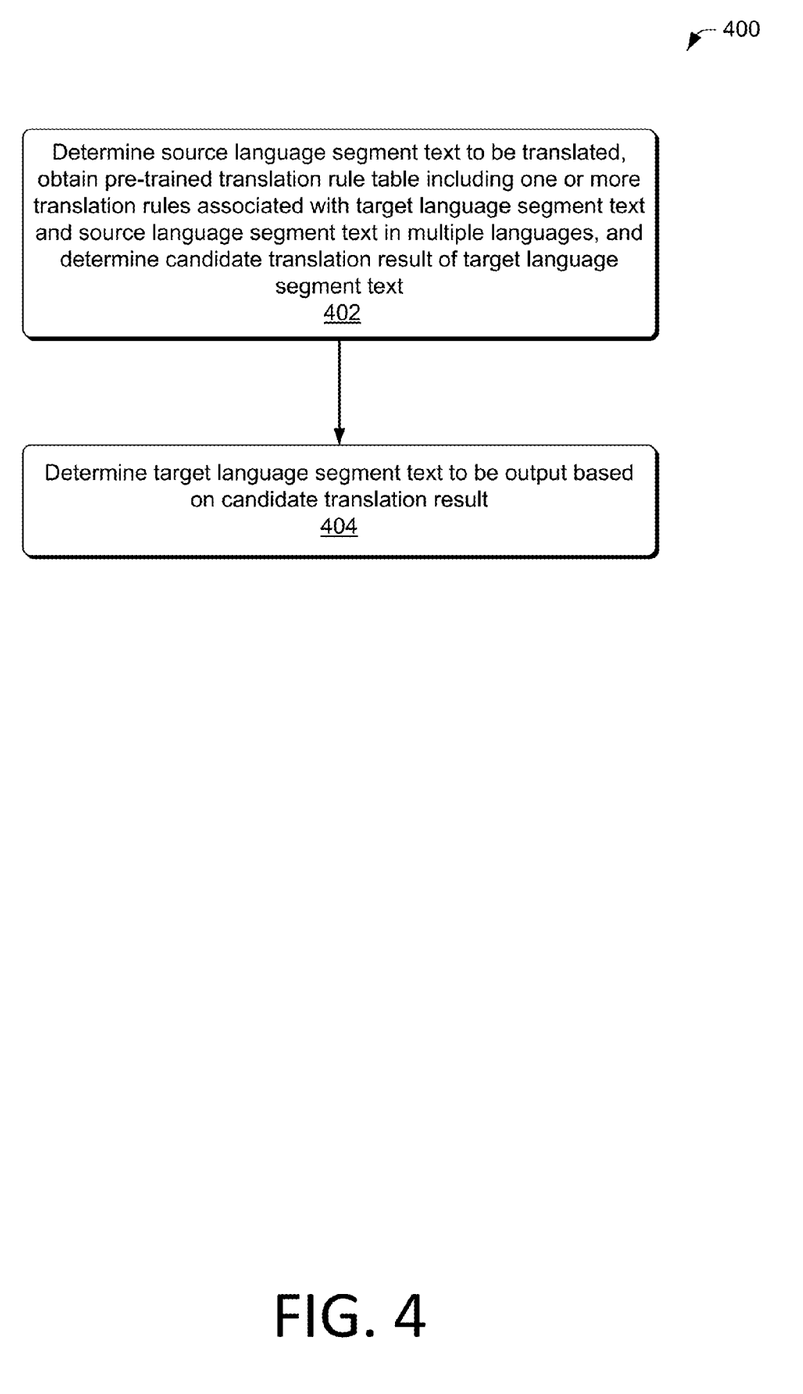
FIG. 4 is a flow chart of an illustrative process for machine translation.

Thus, the implementations provide a method for machine translation, as illustrated in FIG. 4. The method may include the following operations.

At 402, the computing device may determine source language text to be translated and obtain a translation rule table including one or more translation rules associated with target language text and the source language text in multiple languages. The translation rule table may be trained in advance. The computing device may further determine candidate results of the target language text.

At 404, the computing device may determine the target language text to be output based on the candidate result.

The implementations utilize a translation rule table including the one or more translation rules associated with target language text and source language text in multiple languages to achieve multi-lingual translation to the target language text from the source language text. During the translation, a specific language of the source language text needs not to be identified. The implementations improve accuracy of the translation, and avoid errors from language identification during handling translation from unknown languages to a target language. The implementations support multi-language translation without performing operations such as segmentation based on languages, translating fragments and then combining translated fragments. The implementations avoid developing a translation engine for an individual language for a certain target language and save development costs and computing resources.

In implementations, the computing device may obtain the translation rule table including the one or more translation rules associated with the target language text and the source language text in the multiple languages and determining candidate results of the target language text by performing the following operations. The computing device may segment the source language text based on a phrases as a unit to obtain phrases and obtain the one or more translation rules associated with target language text and the source language text in the multiple languages to determine a translation result corresponding to each of the phrases.

The computing device may splice the translation result corresponding to each of the phrases, or splice the phrases, and search the one or more translation rules associated with the target segment text and the source language text in the multiple languages to obtain at least one candidate result of the target language text.

In implementations, when the source language text includes phrases in a single language, the computing device may determine the target language text to be output based on the candidate results by performing the following operations. The computing device may perform language model scoring, translation rule table scoring, and/or reordering model scoring to each of candidate results, and select candidate results as the target language text to be output based on scoring results.

In implementations, when the source language text includes phrases in a single language, the computing device may select the candidate results as the target language text to be output based on the scoring results by performing the following operations. For each candidate result of the candidate results, the computing device may multiply a score result of the language model scoring by a weight of the language model, multiply a score result of the translation rule table scoring by a weight of the translation rule table, and multiply a score result of the reordering model scoring by a weight of the reordering model to obtain products. The computing device may then add the products to obtain a value corresponding to each candidate result of the candidate results. The computing device may select one or more candidate results having a maximum value as the target language text to be output.

In implementations, when the source language text includes phrases in multiple languages, the computing device may determine the target language text to be output based on the candidate results by performing the following operations. The computing device may perform language model scoring and translation rule table scoring to each of candidate results, and select candidate results as the target language text to be output based on the score results.

That is, when the source language text includes phrases in multiple languages, the reordering model scoring needs not to be invoked, and there is no corresponding query result for the reordering model scoring. Therefore, the operation is regarded as positive sequence output, and the situation in reverse order is not considered.

In implementations, when the source language text includes phrases in multiple languages, the computing device may select the candidate results as the target language text to be output based on the scoring results by performing the following operations. For each candidate result of the candidate results, the computing device may multiply a score result of the language model scoring by a weight of the language model and multiply a score result of the translation rule table scoring by a weight of the translation rule table to obtain products. The computing device may further add the products to obtain a value corresponding to each candidate result of the candidate results.

The computing device may select one or more candidate results having a maximum value as the target language text to be output. Corresponding to the method above, as illustrated in FIG. 5, the implementations further relate to a device for machine translation.

Figure 5:
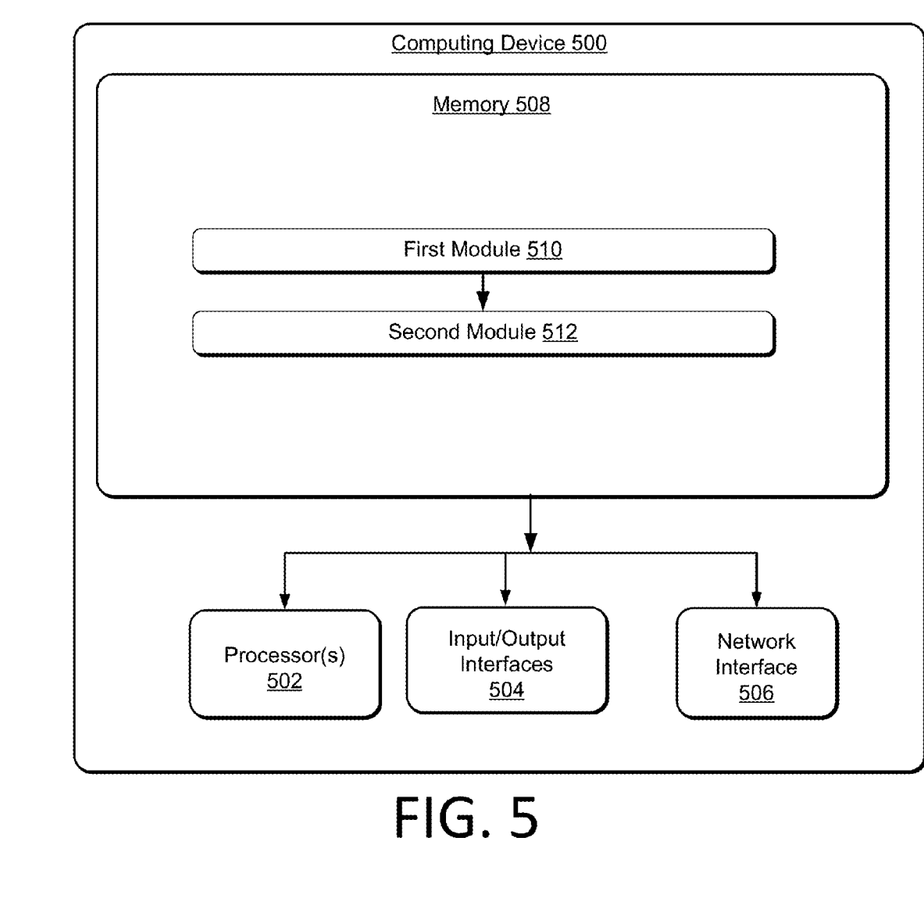
FIG. 5 is a schematic diagram of an illustrating computing architecture that enables machine translation.

FIG. 5 is a diagram of a computing device 500. The computing device 500 may be a user device or a server for a multiple location login control. In one exemplary configuration, the computing device 500 includes one or more processors 502, input/output interfaces 504, network interface 506, and memory 508.

The memory 508 may include computer-readable media in the form of volatile memory, such as random-access memory (RAM) and/or non-volatile memory, such as read only memory (ROM) or flash RAM. The memory 508 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 508 in more detail, the memory 508 may store thereon a first module 510 and a second module 512.

The first module 510 may be configured to determine source language text to be translated, obtain a translation rule table including one or more translation rules associated with target language text and the source language text in multiple languages and determine candidate results of the target language text. The translation rule table has been trained in advance.

The second module 12 may be configured to determine the target language text to be output based on the candidate result.

In implementations, the first module 510 may obtain the translation rule table including the one or more translation rules associated with the target language text and the source language text in the multiple languages and determine candidate results of the target language text by performing the following operations. The first module 510 may segment the source language text using a phrases as a unit to obtain phrases and obtain the one or more translation rules associated with target language text and the source language text in the multiple languages to determine a translation result corresponding to each of the phrases.

The first module 510 may then splice the translation result corresponding to the each of the phrases, or splice the phrases, and search the one or more translation rules associated with the target segment text and the source language text in the multiple languages to obtain at least one candidate result of the target language text.

In implementations, when the source language text includes phrases in a single language, the second module 512 may be configured to further perform language model scoring, translation rule table scoring, and/or reordering model scoring to each of candidate results, and select candidate results as the target language text to be output based on scoring results.

In implementations, when the source language text includes phrases in a single language, the second module 512 may select the candidate results as the target language text to be output based on the scoring results by performing the following operations. For each candidate result of the candidate results, the second module 512 may multiply a score result of the language model scoring by a weight of the language model, multiply a score result of the translation rule table scoring by a weight of the translation rule table, and multiply a score result of the reordering model scoring by a weight of the reordering model to obtain products, and then add the products to obtain a value corresponding to each candidate result of the candidate results. The second module 512 may further select one or more candidate results having a maximum value as the target language text to be output.

In implementations, when the source language text includes phrases in multiple languages, the second module 512 is configured to further perform language model scoring and translation rule table scoring to each of candidate results and to select candidate results as the target language text to be output based on scoring results.

In implementations, when the source language text includes phrases in multiple languages, the second module 512 may select the candidate results as the target language text to be output based on the scoring results by performing the following operations. For each candidate result of the candidate results, the second module 512 may multiply a score result of the language model scoring by a weight of the language model and multiply a score result of the translation rule table scoring by a weight of the translation rule table to obtain products. The second module 512 may then add the products to obtain a value corresponding to each candidate result of the candidate results, and select one or more candidate results having a maximum value as the target language text to be output.

Figure 6:
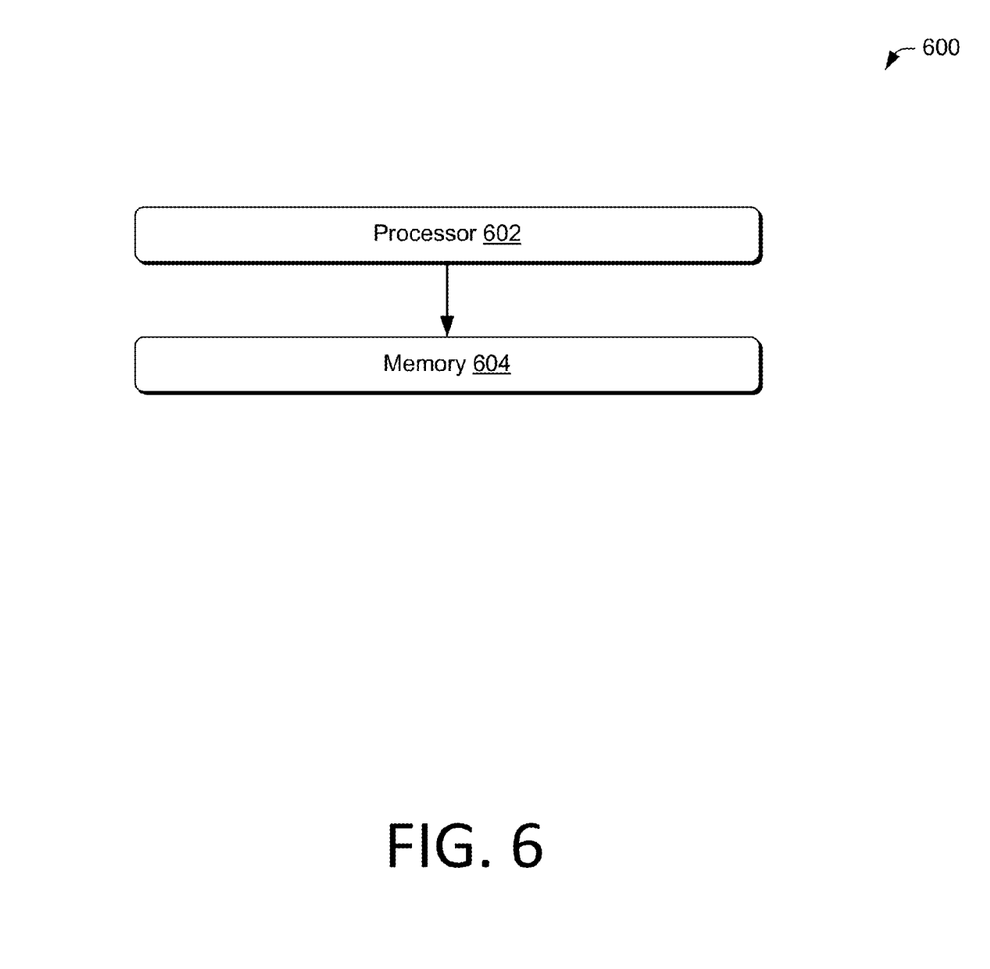
FIG. 6 is another schematic diagram of an illustrating computing architecture that enables machine translation.

The first module 510 and the second module 512 may be implemented by a computing device including one or more processors. For example, as illustrated in FIG. 6, the implementations further relate to a computing device 600 for machine translation. The computing device 600 may include a processor 602 configured to execute a computer program to perform the following operations.

The processor 602 may determine source language text to be translated, obtain a translation rule table including one or more translation rules associated with target language text and the source language text in multiple languages, and determine candidate results of the target language text. Based on the candidate results, the processor 602 may determine the target language text to be output. The translation rule table has been trained in advance.

The computing device 600 may further include memory 604 configured to store the computer program code.

In implementations, the processor 602 may obtain a translation rule table including the one or more translation rules associated with target language text and the source language text in multiple languages and determine candidate results of the target language text by performing the following operations. The processor 602 may segment the source language text using a phrases as a unit to obtain phrases and obtain the one or more translation rules associated with target language text and the source language text in the multiple languages to determine a translation result corresponding to each of the phrases.

The processor 602 may splice the translation result corresponding to the each of the phrases, or splice the phrases, and search the one or more translation rules associated with the target segment text and the source language text in the multiple languages to obtain at least one candidate result of the target language text.

In implementations, when the source language text includes phrases in a single language, the processor 602 may perform language model scoring, translation rule table scoring, and/or reordering model scoring to each of candidate results, and select candidate results as the target language text to be output based on scoring results.

In implementations, when the source language text includes phrases in a single language, the processor 602 may select candidate results as the target language text to be output based on scoring results by performing the following operations. For each candidate result of the candidate results, the processor 602 may multiply a score of the language model scoring by a weight of the language model, multiply a score of the translation rule table scoring by a weight of the translation rule table, and multiply a score of the reordering model scoring by a weight of the reordering model to obtain products. The processor 602 may further add the products to obtain a value corresponding to each candidate result of the candidate results and select one or more candidate results having a maximum value as the target language text to be output.

In implementations, when the source language text includes phrases in multiple languages, the processor 602 may perform language model scoring and translation rule table scoring to each of candidate results and select candidate results as the target language text to be output based on scoring results.

In implementations, when the source language text includes phrases in multiple languages, the processor 602 may select candidate results as the target language text to be output based on scoring results by performing the following operations. For each candidate result of the candidate results, the processor 602 may multiply a score of the language model scoring by a weight of the language model and multiplying a score of the translation rule table scoring by a weight of the translation rule table to obtain products. The processor 602 may add the products to obtain a value corresponding to each candidate result of the candidate results and select one or more candidate results having a maximum value as the target language text to be output.

In summary, the phrase rule table (i.e., the phrase table) includes source language segments in multiple languages. According, without specifying a language for text to be translated, using the phrase rule table, a computing device may return corresponding target text and a corresponding score of translation rules based on a phrase fragment of a certain source language segment. Therefore, to a certain extent, the implementations of the present disclosure has achieved translation that is not sensitive to source languages. In addition, In the decoding stage, the computing device uses limits of the reordering model to enable supporting of translation of text in mixed languages. Without specifying a language for text to be translated, any translation engine may process translation from the source language segment in various languages to the target language segment.

The techniques of the present disclosure are also applicable to syntax-based translation models including a phrase level model, a model from tree to a string, a model from a string to a tree, and a model from a tree to tree. In the syntax-based models, no matter whether it's a phrase level model, a model from a tree to a string, and a model from a string to a tree, it inevitably uses a phrase as a basic translation unit while structures of translation rules in the phrase table may be different. Accordingly, by splicing alignment results between sentence pairs and word pairs as well as extracting expressions of translation rules, the implementations of the present disclosure may be applied to the above statistical machine translation processes.

Those skilled in the art should understand that the implementations of the present disclosure provide methods, systems, or computer program products. Accordingly, the present disclosure may be entirely implemented by hardware, software, or a combination of hardware and software. The present disclosure can be used in one or more computer usable storage media (including but not limited to the optical disk storage and memory, etc.) that contain computer usable program codes and are implemented on a computer program product.

The present disclosure is described using methods, devices (systems), and flowcharts and/or block diagrams of computer program product. It should be understood that one or more processors of a computing device may perform one or more operations as described in a flowchart a block diagram or a combination thereof using the computer program instructions. These computer program instructions may be provided to a general purpose computer, a special purpose computer, an embedded processor or other programmable data processing apparatus to produce a machine such that the instructions executed by a computer or other programmable data processing apparatus to produce operations of a flow chart of the device for implementing a specified function thereof.

These computer program instructions may also be stored in a computer-readable memory that can direct a computer or other programmable data processing apparatus to function in a particular manner such that the instructions are stored in the computer-readable memory including instruction generating means for producing operations. The instruction means may be implemented to achieve a specified function in a process flow chart or a plurality of processes and/or block diagram block or blocks.

These computer program instructions may also be loaded onto a computer or other programmable data processing apparatus such that a series of steps on the computer or other programmable apparatus can process a certain function in of a process or a plurality of processes in a flowchart or flowcharts and/or block diagram block or blocks. Although the present disclosure is described using references of certain preferred embodiments, the present disclosure has been shown and described above, and one of ordinary skill in the art should understand that forms and details may vary without departing from the spirit and scope of the present disclosure.

The embodiments are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

What is claimed is:

1. A method for machine translation comprising:
   determining, by one or more processors of a computing device, a source language text to be translated;
   obtaining, by the one or more processors, a translation rule table comprising one or more translation rules, wherein the one or more translation rules is associated with at least a first bilingual parallel corpus and a second bilingual parallel corpus, the first bilingual parallel corpus forming a first language pair between a first source language and a target language, and the second bilingual parallel corpus forming a second language pair between a second source language and the target language;
   determining, by the one or more processors, a candidate result of a target language text based at least in part on the translation rule table; and
   determining, by the one or more processors, the target language text to be output based on the candidate result.

2. The method of claim 1, wherein the determining the candidate result of the target language text comprises:
   dividing the source language text using a phrase as a unit to obtain one or more phrases;
   obtaining the one or more translation rules associated with the target language text and the source language text in the multiple languages to determine a translation result corresponding to each of the phrases; and
   splicing translation results corresponding to the phrases, or splicing the phrases and searching the one or more translation rules associated with the target language text and the source language text in the multiple languages, to obtain at least one candidate result of the target language text.

3. The method of claim 2, wherein the determining the target language text to be output based on the candidate result comprises:
   determining that the source language text comprises phrases in a single language;
   performing language model scoring, translation rule table scoring, and reordering model scoring to each of candidate results; and
   selecting one or more candidate results as the target language text to be output based on scoring results.

4. The method of claim 3, wherein the selecting the one or more candidate results as the target language text to be output based on the scoring results comprises:
   multiplying a score of the language model scoring by a weight of the language model, multiplying a score of the translation rule table scoring by a weight of the translation rule table, and multiplying a score of the reordering model scoring by a weight of the reordering model to obtain products for each candidate result of the one or more candidate results;
   adding the products to obtain a value corresponding to each candidate result of the one or more candidate results; and
   selecting at least one candidate result having a maximum value as the target language text to be output.

5. The method of claim 2, wherein the determining the target language text to be output based on the candidate result comprises:
   determining that the source language text comprises phrases in multiple languages;
   performing language model scoring and translation rule table scoring to each of candidate results; and
   selecting one or more candidate results as the target language text to be output based on scoring results.

6. The method of claim 5, wherein the selecting the one or more candidate results as the target language text to be output based on the scoring results comprises:
   multiplying a score of the language model scoring by a weight of the language model and multiplying a score of the translation rule table scoring by a weight of the translation rule table to obtain products for each candidate result of the one or more candidate results;
   adding the products to obtain a value corresponding to each candidate result of the one or more candidate results; and
   selecting at least one candidate result having a maximum value as the target language text to be output.

7. A device for machine translation comprising:
   one or more processors; and
   memory to maintain a plurality of components executable by the one or more processors, the plurality of components comprising:
      a first module configured to:
         determine a source language text to be translated,
         obtain a translation rule table comprising one or more translation rules associated with a target language text and the source language text in multiple languages, the target language text and the source language text in the multiple languages forming multiple language pairs, the translation rule table trained in advance, and
         determine a candidate result of the target language text, and
      a second module configured to determine the target language text to be output based on the candidate result.

8. The device of claim 7, wherein the first module is further configured to:
   divide the source language text using a phrase as a unit to obtain phrases;
   obtain the one or more translation rules associated with the target language text and the source language text in the multiple languages to determine a translation result corresponding to each of the phrases; and
   splice the translation result corresponding to the each of the phrases, or splicing the phrases and searching the one or more translation rules associated with the target language text and the source language text in the multiple languages, to obtain at least one candidate result of the target language text.

9. The device of claim 8, wherein when the source language text comprises phrases in a single language, the second module is further configured to further:
   perform language model scoring, translation rule table scoring, and reordering model scoring to each of candidate results; and
   select one or more candidate results as the target language text to be output based on scoring results.

10. The device of claim 9, wherein the second module is further configured to:

multiply a score of the language model scoring by a weight of the language model, multiply a score of the translation rule table scoring by a weight of the translation rule table, and multiply a score of the reordering model scoring by a weight of the reordering model to obtain products for each candidate result of the one or more candidate results;

add the products to obtain a value corresponding to each candidate result of the one or more candidate results; and select at least one candidate result having a maximum value as the target language text to be output.

11. The device of claim 7, wherein the second module is further configured to:

perform language model scoring and translation rule table scoring to each of candidate results when the source language text comprises phrases in multiple languages; and select one or more candidate results as the target language text to be output based on scoring results.

12. The device of claim 11, wherein the second module is further configured to:

multiply a score of the language model scoring by a weight of the language model and multiply a score of the translation rule table scoring by a weight of the translation rule table to obtain products for each candidate result of the one or more candidate results;

add the products to obtain a value corresponding to each candidate result of the one or more candidate results; and select at least one candidate result having a maximum value as the target language text to be output.

13. One or more computer-readable media storing computer-executable instructions that, when executed by one or more processors, instruct the one or more processors to perform acts comprising:

determining a source language text to be translated;

obtaining a translation rule table comprising one or more translation rules associated with a target language text and the source language text in multiple languages, the target language text and the source language text in the multiple languages forming multiple language pairs, the translation rule table trained in advance;

determining a candidate result of the target language text; and determining the target language text to be output based on the candidate result.

14. The one or more computer-readable media of claim 13, wherein the determining the candidate result of the target language text comprises:

dividing the source language text using a phrase as a unit to obtain phrases;

obtaining the one or more translation rules associated with the target language text and the source language text in the one or more languages to determine a translation result corresponding to each of the phrases; and splicing translation results corresponding to the phrases, or splicing the phrases and searching the one or more translation rules associated with the target language text and the source language text in the one or more languages, to obtain at least one candidate result of the target language text.

15. The one or more computer-readable media of claim 14, wherein the determining the target language text to be output based on the candidate result comprises:

determining that the source language text comprises phrases in a single language;

performing language model scoring, translation rule table scoring, and reordering model scoring to each of candidate results; and selecting one or more candidate results as the target language text to be output based on scoring results.

16. The one or more computer-readable media of claim 15, wherein the selecting the one or more candidate results as the target language text to be output based on the scoring results comprises:

multiplying a score of the language model scoring by a weight of the language model, multiplying a score of the translation rule table scoring by a weight of the translation rule table, and multiplying a score of the reordering model scoring by a weight of the reordering model to obtain products for each candidate result of the one or more candidate results; and selecting the one or more candidate results as the target language text to be output based on the products.

17. The one or more computer-readable media of claim 16, wherein the selecting the one or more candidate results as the target language text to be output based on the products comprises:

adding the products to obtain a value corresponding to each candidate result of the one or more candidate results; and selecting at least one candidate result having a maximum value as the target language text to be output.

18. The one or more computer-readable media of claim 14, wherein the determining the target language text to be output based on the candidate result comprises:

determining that the source language text comprises phrases in multiple languages;

performing language model scoring and translation rule table scoring to each of candidate results; and selecting one or more candidate results as the target language text to be output based on scoring results.

19. The one or more computer-readable media of claim 18, wherein the selecting the one or more candidate results as the target language text to be output based on the scoring results comprises:

multiplying a score of the language model scoring by a weight of the language model and multiplying a score of the translation rule table scoring by a weight of the translation rule table to obtain products for each candidate result of the one or more candidate results; and selecting the one or more candidate results as the target language text to be output based on the products.

20. The one or more computer-readable media of claim 19, wherein the selecting the one or more candidate results as the target language text to be output based on the products comprises:

adding the products to obtain a value corresponding to each candidate result of the one or more candidate results; and selecting at least one candidate result having a maximum value as the target language text to be output.

* * * * *